June 5, 1973 J. B. WELLS 3,737,311

ELECTROSTATIC PARTICLE TRANSFER IMAGING PROCESS

Original Filed Nov. 4, 1968

INVENTOR.
JOHN B. WELLS
BY
David C. Petre
ATTORNEY

3,737,311
ELECTROSTATIC PARTICLE TRANSFER IMAGING PROCESS

John B. Wells, Brighton, N.Y., assignor to Xerox Corporation, Rochester, N.Y.

Continuation of abandoned application Ser. No. 773,046, Nov. 4, 1968. This application June 4, 1971, Ser. No. 150,211
Int. Cl. G03g *13/14, 13/22*
U.S. Cl. 96—1 R 15 Claims

ABSTRACT OF THE DISCLOSURE

A thin electrically insulating transfer interlayer, which is selectively releasable by area, is sandwiched between a photosensitive layer and a receiver member. The sandwich is exposed to an image pattern of activating electromagnetic radiation for said photosensitive layer while maintaining an electric field across said sandwich. The receiver member is then stripped away to selectively transfer areas of said interlayer in image configuration to said receiver member leaving a complementary image pattern of selective areas of interlayer on said photosensitive layer.

CROSS-REFERENCE TO RELATED APPLICATION

This is a continuation of U.S. application Ser. No. 773,-046 filed on Nov. 4, 1968.

BACKGROUND OF THE INVENTION

This invention relates in general to imaging and more specifically to an imaging system for the formation of images by layer transfer in image configuration.

Although imaging techniques based on layer transfer of a marking material have been known in the past, these techniques have always been clumsy and difficult to operate because they depend upon photochemical reactions and generally involve the use of distinct layer materials for the two functions of imagewise transfer and image coloration. A typical example of the complex structures and sensitive materials employed in prior art techniques is described in U.S. Pat. 3,091,529 to Buskes. A more comprehensive discussion of prior art imaging techniques based on layer transfer may be found in copending application Ser. No. 452,641, filed May 3, 1965, in the U.S. Patent Office, now abandoned.

Copending application Ser. No. 452,641 describes a uniquely advantageous imaging system utilizing a manifold set comprising a photoresponsive material, which is also selectively releasable by area, on a substrate. A receiving sheet is laid down over a surface of the photoresponsive material, and an electric field is applied across the sandwich. The photoresponsive material is exposed to a pattern of activating radiation representative of the image to be reproduced. Upon separation of the photoresponsive member and receiving sheet the photoresponsive layer itself is found to fracture along the lines defined by the radiation exposure pattern with at least a partial thickness of the photoresponsive layer being transferred to the receiving sheet while the remainder remains on the substrate. Typically the entire thickness of said layer is completely transferred to the receiver sheet in image configuration so that a positive image, that is a duplicate of the original is produced on either the reecver or the substrate, while the negative image is produced on the other.

At least one of the substrate or the receiver sheets is a least partially transparent to the activating radiation pattern to permit exposure of the photoresponsive layer to the image radiation pattern to be reproduced. The photoresponsive layer serves the dual function of imparting light sensitivity to the system, while at the same time acting as the colorant for the final image produced.

While advantageous, especially in view of the less than satisfactory prior art imaging techniques, the concept does require that the photoresponsive layer be stripped out and thus reuse of the photoresponsive layer to produce additional images is not possible. In addition, the degree of coloring of the images may be somewhat limited in that the colorant by the above technique must, of course, also be photoresponsive. Photoresponsive layer materials typically comprise relatively expensive photoconductive materials. Another limitation of this manifold imaging technique, which this invention overcomes is that the photoresponsive layer must have very definite physical stripout characteristics.

An advantageous particle layer transfer system is described in Gundlach Pats. 2,968,552 and 3,166,418 but, inter alia, the particle layer must be uniformly electrostatically charged, the photoresponsive member employs a photoconductor layer of typical xerographic thickness and the receiving sheet must have a particular resistivity.

Thus, there is a continuing need for a better and more versatile layer transfer imaging system.

SUMMARY OF THE INVENTION

It is, therefore, an object of this invention to provide an imaging system which overcomes the above-noted disadvantages.

It is a further object of this invention to provide a method of imagewise transferring a layer of material which need not itself be photoconductive.

It is a further object of this invention to provide a layer transfer imaging system where the transfer layer is easily dyed, pigmented or otherwise colored to give a desired colored final image.

It is a still further object of this invention to provide a layer transfer imaging system wherein the transfer layer is made up of any one of a wide variety of readily available relatively inexpensive materials.

It is a still further object of this invention to provide a layer transfer imaging system which is highly photosensitive and responds to input radiation images of a broad spectral range.

It is a still further object of this invention to provide a particle layer transfer imaging system.

It is a still further object of this invention to provide a continuous layer transfer imaging system.

It is a still further object of this invention to provide what is thought to be a selective adhesion imaging system.

It is a still further object of this invention to provide an interlayer transfer imaging system utilizing a photoconductor photoinjecting layer which is preferably a fraction of the thickness of typical xerographic photoconductor layers.

It is a still further object of this invention to provide a layer transfer imaging system which does not require electrostatic charging of the transfer layer.

The foregoing objects and others are accomplished in accordance with this invention by providing a thin electrically insulating, selectively releasable by area, transfer interlayer sandwiched between a photosensitive layer and a receiver member. The sandwich is exposed to an image pattern of activating electromagnetic radiation for said photosensitive layer while maintaining an electric field across said sandwich. The receiver member is then stripped away to selectively transfer areas of said interlayer in image configuration to said receiver member leaving a complementary image pattern of selective areas of interlayer on said photosensitive layer.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
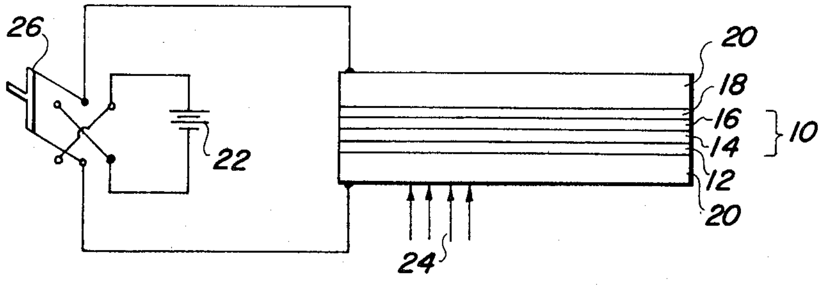
FIG. 1 is a side sectional view of an embodiment of an imaging member for use in this invention with a typical means for applying an electric field across the member.
Figure 2:
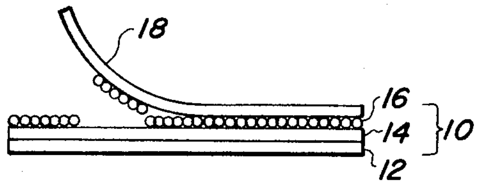
FIG. 2 is a side sectional view of an embodiment of an imaging member hereof with the receiving sheet being stripped off taking with it, selective portions, in image configuration of a transfer interlayer composed of particles.

Referring now to FIG. 1, imaging member 10 is made up of substrate 12, photosensitive layer 14, electrically insulating transfer interlayer 16, and receiver sheet 18. Sandwiching the member 10 are electrodes 20 electrically connectable to direct current source 22 by reversible double pole switch 26. Electrodes 20 are shown to be separate from substrate 12 and receiver sheet 18 although they may be directly on the back surface of these members and integral therewith or members 12 and 18 may be electrically conductive and serve as the electrodes too. Typical such integral members are aluminum laminated paper and aluminized polystyrene. Substrate 12 and receiver sheet 18 may be almost any material capable of being layered to form a continuous substrate and may consist of the same or different materials which may be electrically conductive or electrically insulating; the only requirement being that at least one of layers 12 and 18 is at least partially transparent to activating radiation for photosensitive layer 14, so that layer 14 may be exposed to activating radiation 24 in image pattern. Receiver member 18 may typically be any well known image support material such as paper or a plastic film. The receiver is typically placed on the transfer interlayer by a light hand pressure to assure uniform contact.

Of course, in the mode of applying the electric field shown, namely by electrodes 20, at least one of the electrodes must at least be partially transparent to activating radiation for layer 14 and be on the same side of layer 14 as a layer 12 or 18 which is also transparent.

Transparent conductive electrodes herein may be of any suitable material. NESA glass (a tin oxide coated glass) available from the Pittsburgh Plate Glass Co. is preferred because it is chemically inert and readily available. Typical transparent conductive materials include conductively coated glass such as tin or indium oxide coated glass and aluminum coated glass, etc. and similar coatings on transparent plastic substrates.

It will also be appreciated that white light opaque support and receiver sheet layers may be exposed through by using a photosensitive layer which is sensitive to exposure radiation which is transmissive through such white light opaque layers. For example, X-rays may permeate an aluminum backing which would be opaque to white light exposure. When exposure is from the receiver layer side, the transfer interlayer must be transmissive to the exposure radiation to permit the exposure to find its way through the transfer interlayer to the photosensitive layer.

While the sandwich hereof has been spoken of and is illustrated to be sheets of material in superposed relation, it will be understood that various automated embodiments may be used including roller electrodes 20 and that one or more of the photosensitive layer or the receiver member may be in web form or in the form of a cylindrical surface, endless belt, moebius strip or other shape with contact being made between the photosensitive layer and the receiver member by means of advancing portions thereof.

As will be explained further, the basic steps in the process of this invention are imagewise exposing layer 14 while subjecting member 10 to an electric field, followed by stripping receiving sheet 18 from the remainder of member 10.

Any suitable mode of producing an electric field may be utilized in addition to the direct current, polarized electrode sandwich configuration of FIG. 1, including uniformly electrostatically charging member 10 by means of a corona discharge device which may be traversed across surface 12 or 18 depositing a uniform charge during the traverse. For example, corona discharge devices of the general description and generally operated as disclosed in Vyverberg Pat. 2,836,725 and Walkup Pat. 2,777,957 have been found to be excellent sources of corona useful in the charging of member 10 to establish the electric field necessary for imaging in this invention. Other charging techniques ranging from rubbing the image to induction charging, for example, as described in Walkup Pat. 2,934,649 are available in the art.

The electric fields preferred for imaging herein run generally from about 10 to about 100 volts/micron across the thickness of photosensitive layer 14 and transfer interlayer 16. Optimum results are obtained when the electric field across these two layers is from about 40 to about 80 volts/micron. Either polarity was found to work herein, probably because the photosensitive layers used were capable of injecting electrons or holes depending on the polarity used; in any case both polarities produce the surprising imaging system hereof. Images are still produced with fields greater than 100 volts/micron but image quality appears to gradually diminish at increasingly higher fields.

When both layers 12 and 18 are electrically insulating, corona charging of member 10, for example, may be accomplished by placing one of the insulating substrates in contact with a conductive member while traversing the corona discharge device across the free surface layer.

Alternatively, other methods known in the art of xerography for charging xerographic plates having insulating backings may be applied. For example, the member may be charged using double-sided corona charging techniques where two corona charging devices on each side of member 10 and oppositely charged are traversed in register relative to the member.

Generally, exposures in the range of from about 0.5 to about 10 f.c.s. of conventional tungsten filament radiation have been found to give excellent imaging results. Of course, images are still produced with higher exposures but image quality is not found to be greatly enhanced.

A step which is found to enhance operation in some modes hereof and typically where transfer interlayer is continuous rather than particulate, is referred to as "activating."

Activating causes or promotes continuous or substantially continuous transfer interlayers to break up or fracture to create bits or particles to thereby create a layer which is selectively releasable by area with resultant image resolution depending on how extensive the fracturing and the smallness of the bits or particles. Activating layer 16 serves to change the selective adhesion characteristics of a particle transfer interlayer relative to the receiving layer and the photosensitive layer and to lessen the transverse internal bond of the transfer interlayer so as to provide for imagewise transfer according to this invention.

One mode of activating layer 16 is to contact it with an activator liquid. It is generally preferred that the activator liquid be electrically insulating so as to prevent electrical breakdown of the manifold set. Thus, it is generally preferred to purify commercial grades so as to remove impurities which might impart a higher level of conductivity to the activating fluids. Generally, the activator may comprise any suitable solvent having the aforementioned properties which has the above-described effect on the imaging layer and may include partial solvents, swelling agents or softening agents either for the transfer interlayer or for the photosensitive layer 14 or for the receiver sheet. The activator may be applied by any suitable means including spraying, brushing and so on. Typical activators for this invention include such solvent activator materials as kerosene, carbon tetrachloride, petroleum ether, silicon oils such as dimethyl-polysiloxanes, long chain aliphatic hydrocarbon oils such as those ordinarily used as transformer oils, kerosene, mineral oils, dry cleaners' naphtha, petroleum ether, hexane, vegetable oils and mixtures thereof.

Another mode of activating transfer interlayer 16 is by applying heat to a heat fusible transfer interlayer matrix (for example eicosane wax, see Example III, or other waxes) for higher melting particles incorporated therein.

Photosensitive layer 14, in an especially preferred embodiment, comprises a phthalocyanine (which includes its metal derivatives) optionally in a resin binder system of the type described in copending application Ser. No. 518,450, filed Jan. 3, 1966, and optimally comprises x-form metal free phthalocyanine as described in Byrne et al. Pat. 3,357,989 optionally in a resin binder. Excellent images are produced according to this invention, with fast photoresponse, and proper selective release of the transfer interlayer from the surface of layer 14 when photo sensitive layer 14 comprises such materials.

Preferred photosensitive materials are those used in the examples.

However, any suitable photosensitive layer may be used in carrying out the invention including many photoconductive materials.

Typical photoconductors include: amorphous selenium, alloys of sulfur arsenic or tellurium with selenium, particulate photoconductive materials such as French process zinc oxide, zinc silicate, cadmium sulfoselenide (for example see Corrsin Pat. 3,151,982), linear quinacridones, particulate selenium (for example see copending application Ser. No. 669,915, filed Sept. 22, 1967) etc., dispersed in an insulating inorganic film forming binder such as a glass or an inert insulating organic film forming binder such as a resin for example an epoxy resin, a silicone resin, an alkyd resin, a styrene-butadiene resin, a wax or the like. Photoconductive resin binders such as polyvinyl carbazole optionally with photoconductive pigments dispersed therein, may also be used. Other typical photoconductive insulating materials include: blends, copolymer, terpolymers, etc. of photoconductors and non-photoconductive materials which are either copolymerizable or miscible together to form solid solutions and organic photoconductive materials of this type include: anthracene, polyvinylanthracene, anthraquinone, oxadiazole derivatives such as 2,5-bis-(p-amino-phenyl-1), 1,3,4-oxadiazole; 2-phenylbenzoxazole; and charge transfer complexes made by complexing resins such as polyvinylcarbazole, phenolaldehydes, epoxies, phenoxies, polycarbonates, etc., with Lewis acid such as tetrachlorophthalic anhydride; 2,4,7 - trinitrofluorenone; metallic chlorides such as aluminum, zinc or ferric chlorides; 4,4-bis(dimethylamino) benzophenone; chloranil; picric acid; 1,3,5-trinitrobenzene; 1-chloroanthraquinone; bromal; 4-nitrobenzaldehyde; 4-nitrophenol; acetic anhydride; maleic anhydride; boron trichloride; maleic acid; cinnamic acid; benzoic acid; tartaric acid; malonic acid and mixtures thereof. Other organic photoconductors include azo dyes such as Watchung Red B, a barium salt of 1-(4'-methyl-5' - chloro-azobenzene - 2' - sulfonic acid)-2-hydroxy-3-naphthoic acid, C.I. No. 15865, a quinacridone, Monastral Red B, both available from Du Pont; Indofast double scarlet toner, a Pyranthrone-type pigment available from Harmon Colors; and quindo magenta RV-6803, a quinacridone-type pigment available from Harmon Colors.

Photosensitive as used herein to describe layer 14 more particularly means "electrically photosensitive." While photoconductive materials (and "photoconductive" is used in its broadest sense to mean materials which show increased electrical conductivity when illuminated with electromagnetic radiation and not necessarily those which have been found to be useful in xerography in a xerographic plate configuration) have been found to be a class of materials useful as "electrically photosensitive" layers in this invention and while the photoconductive effect is often sufficient in the present invention to provide an "electrically photosensitive" layer it does not appear to be a necessary effect. The necessary effect according to the invention apparently is that electrons or holes (electron deficient atoms) are generated by layer 14 in response to the absorption by layer 14 of activating radiation and that these electrons or holes are separated from layer 14 by the electric field which then draws them into the insulating transfer interlayer 16 which surprisingly changes its adhesion to layer 14 or receiving sheet 18 to permit imagewise stripping. This photogeneration of holes or electrons in a layer with separation of the holes or electrons from the generating layer and the drawing of the holes or electrons into an adjacent layer is herein termed photoinjection. This theory suggests and it has been generally verified by practical results that it is preferred that photosensitive layer 14, for optimum quality results with optimum economy of photosensitive materials, be not greater than a thickness of about 5 microns. Layer 14 thicknesses down to 0.1 micron have been found to give optimum quality images. This range for the thickness of photosensitive layer 14 of from about 0.1 to about 5 microns is also preferred because of the added versatility of exposing from the under side of layer 14, through the layer 12 as the imaging member is illustrated in FIG. 1. While photosensitive layers thicker than about 5 microns may be used, the additional thicknesses are not necessary and generally do not enhance image quality and tend to rule out rear exposure because it is preferred that the surface of layer 14 adjacent the transfer interlayer absorb substantial activating exposure radiation to optimize the photoinjecting effect of this invention, and the thicker the photosensitive layer the greater the chance that substantially all of the rear exposure radiation will be absorbed in the photoconductor layer without the desired electrical effect, before it reaches the surface thereof adjacent the transfer interlayer.

Transfer interlayer 16 which may be photosensitively inert is made up of electrically insulating particles or a continuous layer which is fracturable into bits before or during stripping. It is found to be preferred herein that interlayer 16 have an electrical resistivity greater than about $10^8$ ohm-cm. and that the layer for preferred imaging results should be in the thickness range of between about 0.2 and about 6 microns with optimum quality images resulting for thickness between about 1.0 and about 3.0 microns. In the preferred particle layer embodiment wherein layer 16 comprises particles, the particles should have an average particle size of between about 0.2 and about 2.0 microns.

Typical materials for interlayer 16 include those which are made up of a resin or a mixture of resins such as thermoplastic or thermosetting resins, or other electrically insulating materials optionally containing dyes, pigments or other suitable color agents. Particles of the interlayer 16 may also be multi-layered, for example, where an outer protective layer or layers provides for a fusible or a solvent softenable core of resin or a core of liquid such as dye or other marking material.

Xerographic toner particles for example as described in Insalaco Pats. 2,892,794, 2,891,011 and 3,079,342; Carlson Reissue Pat. 25,136; Copley Pat. 2,659,670; Landrigan Pat. 2,753,308; and others may also be used herein as transfer interlayers 16.

Preferred transfer interlayers, along with particle transfer interlayers, are those comprising toner or other marking particles incorporated in a softenable matrix, one for example which is softenable or dissolvable in an activating solvent which is not a good solvent for the particles. Suitable matrix materials include thermoplastic resins, for example medium molecular weight (up to about 6000) polyethylene, Piccotex 100, a styrene-vinyl toluene copolymer available from Pennsylvania Industrial Chemical Corp., or eicosane wax and other waxes and low melting thermoplastics.

The following examples further specifically define the transfer layer invention hereof. The parts and percentages are by weight unless otherwise indicated. Exposure radiation is Photoflood tungsten filament radiation unless otherwise specified. The examples below are intended to illustrate various preferred embodiments in the transfer layer imaging system of this invention.

EXAMPLE I

A phthalocyanine binder photoconductor layer corresponding to layer 14 is formed on about a 5-mil aluminum substrate by predispersing about 3 parts of x-form metal free phthalocyanine pigment in Sohio odorless solvent and adding this to about 7.6 parts of polyethylene AC–8 from Allied Chemical which is then heated to dissolve the polyethylene. The cooled mixture is coated on the aluminum substrate and heated above about 150° C. to melt the polyethylene and remove the Sohio solvent to form a plastic, binder matrix containing phthalocyanine pigment on the substrate, with a dried thickness of about 4 or 5 microns.

The aluminum substrate serves both as the substrate 12 and as electrode 20. The dried photoconductor layer is then overcoated with a polyethylene suspension formed by dissolving about 2½ parts of polyethylene from Allied Chemical Corp. available as Polyethylene No. 8 in about 40 parts of Isopar G a long chain saturated aliphatic hydrocarbon, boiling point 315–350° F., from Humble Oil Co. of New Jersey, and then precipitating polyethylene particles of an average size of about 0.5 micron by adding about 50 parts of isopropyl alcohol to give a milky appearing suspension, which dries to form about a 2-micron layer of polyethylene particles on the phthalocyanine photosensitive layer.

Sohio odorless solvent is sprayed onto the particles to ensure an electric field across the particles and to impart the desired amount of adhesiveness of the particles to the receiver sheet and the photoconductor layer in imaging.

About a 3-mil Mylar polyester film receiving sheet is then placed in sandwich configuration with the photoconductor layer over the polyethylene particle layer.

A field of about 40 volts/micron is applied across the member by positively corona charging the Mylar receiver sheet surface to a surface potential of about +3,300 volts while the aluminum substrate is grounded.

With the electric field across the sandwich, the member is exposed from the Mylar side to an image pattern of radiation from a tungsten filament lamp at an exposure of about 2 f.c.s.

The receiving sheet of Mylar is stripped away from the photoconductor layer to produce an image pattern of polyethylene particles on the Mylar sheet corresponding to the exposed portions of the polyethylene particulate layer. A corresponding image of opposite image sense corresponding to the unexposed areas is left behind on photosensitive layer 14. The images exhibit good solid area coverage with resolution exceeding 20 lp./mm.

Of course, either image may be fixed by any suitable method including overcoating with a film former in a solvent, laminating a clear plastic layer or by transferring the image on the photoconductor layer to an adhesive layer or by other transfer techniques and then reusing the photoconductor layer.

The polyethylene particle image is fixed onto the Mylar receiving sheet in this example simply by heating to about 100° C. for about 2 seconds to fuse the particles to the surface of the Mylar.

EXAMPLE II

Example I is followed except that the milky polyethylene suspension before coating has about 0.5 part of Irgazine Red, a red pigment described in U.S. Pat. 2,973,358 and available from the Geigy Chemical Corp., added to it to give a dried polyethylene particulate layer of a bright red color.

The transfer interlayer is activated as in Example I by spraying with Sohio odorless solvent.

An about 5-mil aluminized Mylar receiving sheet is used in place of the Mylar with the field applied by electrically connecting the aluminized receiver sheet (aluminum side up and the Mylar side down adjacent the transfer interlayer) to the positive post of about a 3000-volt direct current source and electrically connecting the aluminum substrate for the photoconductor layer to the negative post to create about a 45-volt/micron field through the interlayer and the photoconductor.

The member is exposed from the receiving sheet side, the aluminized receiver sheet being sufficiently thin to be about 50% white light transmissive.

EXAMPLE III

Example I is followed except that the polyethylene suspension is modified so that the particles include about 20% eicosane and is applied to the Mylar receiver sheet.

EXAMPLES IV–IX

Example I is followed except that the phthalocyanine pigment is replaced respectively with Example IV Golden Yellow RK (with a C.I. of 59,105, from American Hoechst Chem. Corp., which is a bromated 3,4,8,9-dibenzpyrenequinone), mainly blue light sensitive with a formula

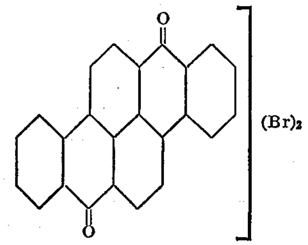

Example V

Indofast Orange Toner with a C.I. of 71105 from Harmon Colors, which is imidazole type pigment, mainly green light sensitive with a formula

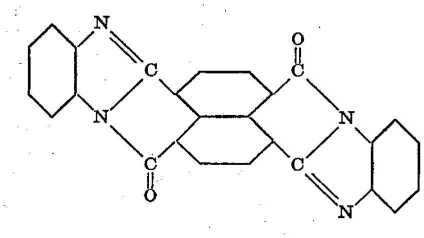

Example VI

Bordeaux RRN with a C.I. of 71100 from American Hoechst Chem. Corp., which is a imidazole type pigment, mainly green light sensitive with a formula

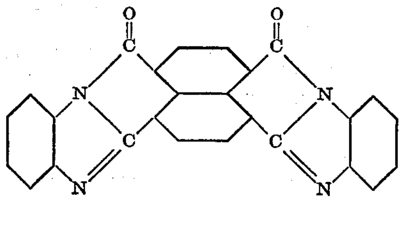

EXAMPLE VII

Anthanthrone from K & K Laboratories mainly ultra violet sensitive with a formula

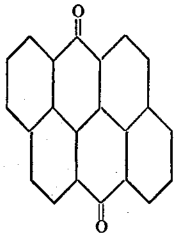

EXAMPLE VIII

Indofast Yellow with a C.I. of 70600 from Harmon Colors, a flavanthrone pigment, mainly blue light sensitive with a formula

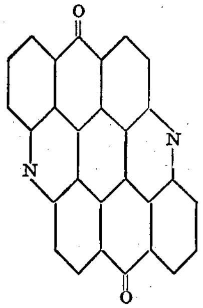

EXAMPLE IX

Indofast Brilliant Scarlet R–6300 with a C.I. of Pigment Red 123 from Harmon Colors, a perylene pigment, mainly blue green light sensitive with a formula

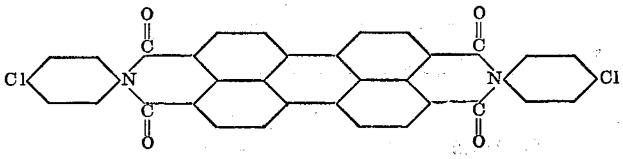

EXAMPLE X

A phthalocyanine binder photoconductor layer as in Example I is formed on 3-mil Mylar substrate. The dried photo-conductive layer is then overcoated with a suspension of polyethylene particles as in Example I to which has been added 1 part ferric stearate powder to 10 parts polyethylene suspension. The coating dries to form about a 1 to 2 micron layer of polyethylene and ferric stearate particles on the phthalocyanine photoconductor layer.

Sohio odorless solvent is applied to the particles as in Example I. A 3-mil Mylar receiving sheet is then placed in sandwich configuration with the polyethylene stearate particle layer. The sandwich is placed between two electrodes 20, one of which is transparent NESA glass. The optical exposure is made through the transparent electrode.

A field of about 20 volts/micron across the photoconductor and particle coating layer is applied by a direct current source connected to the electrodes 20 by grounding one of the electrodes and connecting the other to about a 3000-volt positive potential. With the electric field across the sandwich the member is exposed to an image pattern of radiation from a tungsten filament lamp at an exposure of about 2 f.c.s.

After exposure the 3-mil Mylar receiving sheet is stripped from the photoconductive layer and an image is formed as in Example I. The image is fixed by heating the Mylar at about 100° C. for about 2 seconds. When cool the Mylar receiver sheet containing the image, consisting of polyethylene and ferric stearate particles, is placed in contact with a surface (paper, metal, etc.) which has previously been coated with gallic acid. Upon application of heat (supplied by a heated roll) heated to anywhere between about 55° C. and 85° C., the ferric stearate particles react with the gallic acid to form a black image on the paper.

EXAMPLE XI

A photoconductive binder plate is made by coating phthalocyanine-polyvinyl carbazole at a ratio of about 12 parts resin binder to about 1 part phthalocyanine from a solvent solution on a NESA plate. The dried photoconductor layer about 4 microns thick is coated with a mixture of eicosane (Eastman Kodak) and electrophotographically inert dyed melamine resin particles (Radiant Color Co. Magenta P–6000–G 420) from a hot melt onto the surface of the NESA plate. The material is allowed to cool to form a uniform film about 3 microns thick.

Paper serves as both the top receiver sheet and the top electrode. A DC potential is applied between the top electrode and the NESA plate to give about 20 volts/micron across the photo-conductor layer and the fracturable transfer interlayer. The configuration is heated with hot air to render the transfer interlayer selectively releasable by area by melting the eicosane. The member is then exposed through the NESA plate to a light image with about 10 f.c.s. in exposed areas. The top receiver electrode is stripped from the surface of the binder layer carrying with it on its underside an image pattern, corresponding to the exposed portions of the transfer layer, of transferred colored particles, which can be further fixed by heating the receiver sheet to about 180° C. A complementary image pattern is left behind on the surface of the photoconductor layer. This pattern may be fixed thereto or may be transferred to another support surface for example by adhesively stripping the image.

EXAMPLE XII

Example XI is followed except that an amorphous selenium continuous photoconductor layer about 0.5 micron thick is used instead of the phthalocyanine binder photoconductor.

EXAMPLE XIII

Example XI is followed except that an hexagonal selenium pigment in a binder photoconductor (about 6 parts of Lexan polycarbonate to about 1 part of hexagonal selenium particles, the layer prepared as taught in aforementioned 669,915) is used instead of the phthalocyanine binder photoconductor.

EXAMPLE XIV

Naphthol Red B pigment particles (1-(2′-methoxy-5′-nitrophenylazo)-2-hydroxy-3″-nitro-3-naphthanilide; C.I. No. 12355 available from Collway Colors) are predispersed in Sohio odorless solvent. This material is then added, about 1 part pigment to about 6 parts polyethylene AC–8 which is heated to dissolve the polyethylene. After cooling, the slurry is coated on 3-mil Mylar and dried in an oven to remove solvent and to fuse the polyethylene to form an adherent uniform photosensitive coating on Mylar.

A slurry of about 1 part Switzer Bros. Fire Orange-Day-Glo pigment and about 4 parts polyethylene are precipitated in the presence of isopropyl alcohol to make a slurry. This material is coated on the preivously formed photosensitive layer to a dry thickness of about 1.5 microns. The coated sheet is placed on a NESA glass plate electrode. The top electrode is densely aluminized polystyrene which also serves as the receiver member 18. A DC voltage is connected to the electrodes to impress a field across the layers 14 and 16 of about 40 volts/micron. The member is exposed through the NESA glass to an image pattern of about 50 f.c.s. in exposed areas. The field is removed and the layered material stored for a period of time in the dark prior to separation of the sheets. This time may be adjusted to suit the application—up to about 2 hours. After storage receiver member 18 is removed (wthout any stripping away of layer 16 because the transverse internal bond or strength of layer 16 and its adhesiveness to the photosensitive layer are greater than the adhesiveness to the stripping layer) the layer 16 is activated by spraying Sohio solvent onto the transfer interlayer to lower its internal bond and adhesiveness to the photosensitive layer, and the receiving sheet replaced. The field is re-applied in the same direction, the receiver layer removed again taking the light struck portions of the transfer interlayer to form an image on the receiver sheet.

Although specific components and proportions have been stated in the above description of preferred embodiments of the transfer layer imaging system hereof, other suitable materials, as listed herein, may be used with similar results. In addition, other materials may be added to materials used herein and variations may be made in the various processing steps to synergize, enhance, or otherwise modify the characteristics of the invention. For example, colorants such as pigments or dyes may be added to the photoconductor layers hereof to change their spectral response. Specifically about equal parts of Monastral Red B, mainly green light sensitive may be used in admixture with the optimal photoconductor x-form, metal free phthalocyanine, mainly red light sensitive, in a resin binder to provide a broadly panchromatic sensitizing layer capable of substantially uniform photoresponse in the invention hereof, throughout the entire visible spectrum.

Also it will be appreciated that support layer 12 in the figures for photosensitive layer 14 may be eliminated if the photosensitive layer is a self-supporting layer or if the photosensitive layer is coated directly on an electrically conductive layer which may serve as an electrode. Also the receiver sheet may serve as an electrode. In the embodiment where the receiver member and the substrate for the photosensitive layer serve as the electrodes very low potentials may be used. Assuming about a $0.1\mu$ thick photosensitive layer and about a $1.0\mu$ transfer interlayer, connecting the electrodes to opposite poles of a 12- or even a 6-volt battery may be used to create an image according to the invention.

It will be understood that various other changes in the details, materials, steps and arrangements, which have been herein described and illustrated in order to explain the nature of the invention, will occur to and may be made by those skilled in the art upon a reading of this disclosure and such changes are intended to be included within the principle and scope of this invention.

What is claimed is:

1. A method of imaging comprising the steps of:

(a) providing at least portions of an electrically insulating transfer interlayer sandwiched between at least corresponding adjacent portions of an electrically photosensitive layer having a thickness of from about 0.1 to about 5 microns and at least corresponding adjacent portions of a receiver layer, said transfer interlayer, which comprises particles of from about 0.2 micron to about 2 microns in average diameter or a continuous fracturable layer, of from about 0.2 micron to about 6 microns in thickness having been applied on said electrically photosensitive layer;

(b) softening or liquefying said transfer interlayer to render said layer more selectively releasable by area by lowering the internal adhesion of said layer and its adhesiveness to the electrically photosensitive layer;

(c) applying an electric field across at least said portions of said transfer interlayer and corresponding adjacent portions of said photosensitive layer by corona charging or opposed, biased electrodes wherein the receiver layer does not entirely constitute one of the electrodes, said transfer interlayer not being subjected directly to a charging step prior to the beginning of being processed according to steps (b), (c), (d) and (e) of this claim, said field being insufficient to produce electrical breakdown;

(d) exposing at least said corresponding adjacent portions of said electrically photosensitive layer to an image pattern of activating electromagnetic radiation, wherein said exposure is at least partially accomplished while the electric field of (c) is being applied; and (e) separating said receiver layer from said electrically photosensitive layer at least in said portions thereof operated on above whereby said electrically insulating transfer interlayer transfers in image configuration with a positive image corresponding to the exposed areas of the transfer interlayer adhering to one of said electrically photosensitive layer and receiver layer and a negative image adhering to the other of said electrically photosensitive layer and receiver layer.

2. An imaging method according to claim 1 wherein a positive image corresponding to the exposed areas of the transfer interlayer is transferred to said receiver layer.

3. An imaging method according to claim 1 wherein said electrically photosensitive layer is on an electrode which is at least partially transparent to activating radiation for said electrically photosensitive layer, further including the step of carrying out said exposure step (d) through said at least partially transparent electrode.

4. An imaging method according to claim 1 wherein said receiver layer is paper.

5. An imaging method according to claim 1 wherein said transfer interlayer has an electrical resistivity not less than about $10^8$ ohm-cm.

6. An imaging method according to claim 1 wherein said transfer interlayer is between about 1 and about 3 microns thick.

7. An imaging method according to claim 1 wherein the electric field applied to the imaging member across said electrically photosensitive layer and said transfer interlayer is between about 10 and about 100 volts/micron.

8. An imaging method according to claim 7 wherein the electric field applied to the imaging member across said electrically photosensitive layer and said transfer interlayer is between about 40 and about 80 volts/micron.

9. An imaging method according to claim 1 wherein said electrically photosensitive layer comprises a photoconductor selected from the group consisting of selenium, phthalocyanine, and its metal derivatives, polyvinyl carbazole and compounds represented by the following molecular structures

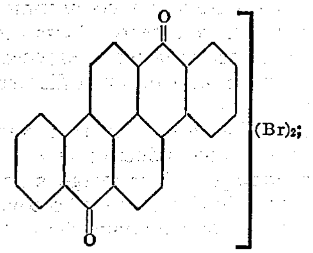

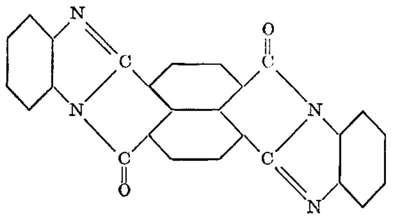

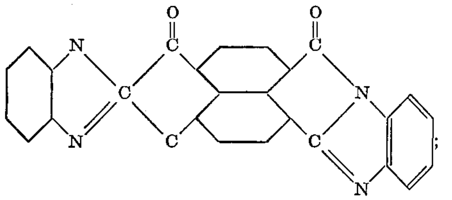

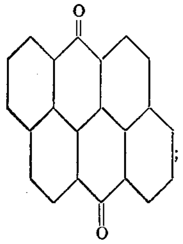

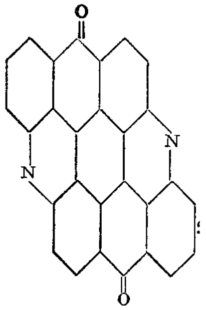

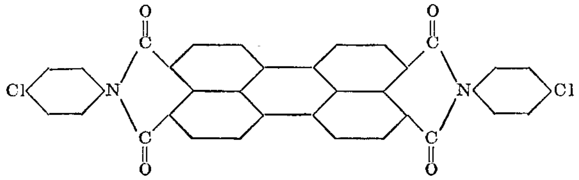

1 - (2' - methoxy-5'-nitrophenylazo)-2-hydroxy-3"-nitro-3-naphthanilide; and mixtures thereof.

10. An imaging method according to claim 1 wherein said softening or liquifying is at least partially accomplished by applying a solvent liquid for said transfer interlayer to said layer.

11. An imaging method according to claim 10 wherein said solvent liquid is electrically insulating.

12. An imaging method according to claim 1 wherein said softening or liquifying is at least partially accomplished by heating said interlayer.

13. An imaging method according to claim 1 wherein said receiver layer has been pressed against the transfer interlayer by at least a light hand pressure to assure uniform contact between said layers.

14. An imaging method according to claim 5 wherein said exposing activating electromagnetic radiation is conventional tungsten filament radiation at an exposure level of from between about 0.5 and about 10 f.c.s.

15. The imaging method of claim 1 wherein said exposure is from the rear of said photosensitive layer.

References Cited

UNITED STATES PATENTS

| | | | |
|---|---|---|---|
| 2,758,525 | 8/1956 | Moncrieff-Yeates | 96—1.3 |
| 3,185,051 | 5/1965 | Goffe | 95—1.7 |
| 2,968,553 | 1/1961 | Gundlach | 96—1 |
| 3,573,906 | 4/1971 | Goffe | 96—1.5 |

CHARLES E. VAN HORN, Primary Examiner

M. B. WITTENBERG, Assistant Examiner

U.S. Cl. X.R.

96—1.3, 1.4; 117—17.5